United States Patent
Ohki et al.

[11] Patent Number: 6,147,716
[45] Date of Patent: Nov. 14, 2000

[54] PICTURE GENERATOR AND PICTURE GENERATION METHOD

[75] Inventors: Mitsuharu Ohki; Hidetoshi Nagano; Takashi Totsuka, all of Tokyo, Japan

[73] Assignee: Sony Corporation, Tokyo, Japan

[21] Appl. No.: 09/233,762

[22] Filed: Jan. 20, 1999

Related U.S. Application Data

[63] Continuation of application No. PCT/JP98/02246, May 22, 1998.

[30] Foreign Application Priority Data

May 23, 1997 [JP] Japan .................................. 9-134037

[51] Int. Cl.[7] ................................ H04N 9/74; H04N 9/75
[52] U.S. Cl. ........................... 348/584; 348/591; 348/592
[58] Field of Search ..................................... 348/572, 573, 348/575, 576, 578, 580, 581, 582, 584, 585, 586, 587, 588, 589, 590, 591, 592, 25, 26, 722; 345/435; 358/22; 364/518, 559; 382/284; 395/121; 318/628; H04N 9/74, 9/75

[56] References Cited

U.S. PATENT DOCUMENTS

| | | | |
|---|---|---|---|
| 4,109,278 | 8/1978 | Mendrala et al. | 358/22 |
| 4,488,169 | 12/1984 | Yamamoto | 358/22 |
| 4,843,568 | 6/1989 | Krueger et al. | 364/518 |
| 4,847,543 | 7/1989 | Fellinger | 318/628 |
| 5,227,985 | 7/1993 | DeMenthon | 364/559 |
| 5,500,684 | 3/1996 | Uya | 348/592 |
| 5,563,988 | 10/1996 | Maes et al. | 395/121 |
| 5,566,251 | 10/1996 | Hanna et al. | 382/284 |
| 5,790,124 | 8/1998 | Fisher et al. | 345/435 |
| 5,812,214 | 9/1998 | Miller | 348/587 |
| 5,825,433 | 10/1998 | Yamada et al. | 348/584 |
| 5,914,748 | 6/1999 | Parulski et al. | 348/239 |
| 5,923,381 | 7/1999 | Demay et al. | 348/592 |

FOREIGN PATENT DOCUMENTS

| | | | |
|---|---|---|---|
| 58-50571 | 3/1983 | Japan | G09F 3/10 |
| 8-18863 | 1/1996 | Japan | H04N 5/272 |

*Primary Examiner*—Sherrie Hsia

[57] ABSTRACT

The present invention relates to a picture generator and a picture generation method. In detail the picture generator provides a mobile photograph device acquires first video data by photographing a performer in front of a predetermined background, a camera parameter calculator acquires the viewpoint of the photograph device, a first video data generator generates second video data corresponding to the projected picture of a predetermined object to which perspective transformation in a case viewed from the viewpoint of the photographing device acquired in the camera parameter calculator is applied, a data delay device acquires third video data by delaying the first video data corresponding to the processing time of the camera parameter calculator and the first video data generator, a first video data synthesizer acquires first synthetic video data by synthesizing the third video data and the second video data, a second video data synthesizer acquires second synthetic video data by synthesizing the first video data and the second video data, and a picture display that displays a picture for assisting the performance of the performer based upon the second synthetic video data. Hereby, a picture for assisting the movement of the performer is hardly delayed and the performer can readily perform.

12 Claims, 4 Drawing Sheets

(VDa)

(α)

(VDc)

(VDd)

PICTURE GENERATOR AND PICTURE GENERATION METHOD

This application is a continuation of international application number PCT JP/98/02246, filed May 22, 1998, now pending.

TECHNICAL FILED

The present invention relates to a picture generator and a picture generation method suitable for using in a virtual studio of a television station for example. In detail, the present invention relates to a picture generator and a picture generation method for providing a picture which assists the performance of a performer when video data acquired by synthesizing video data acquired by photographing the performer and video data corresponding to the projected picture of a predetermined object is obtained.

BACKGROUND ART

Recently, a person and others are photographed in a studio called a virtual studio in a television station and others, the photographed picture and a picture generated by computer graphics (CG) are synthesized and the synthesized picture is broadcast.

A weather forecast program will be described in detail as an example below. First, a performer is instructed to stand in a blue background and is photographed with a television camera. Video data from the television camera and the video data of an object generated by CG such as a Japanese map including weather information are synthesized so as to generate synthetic video data related to a synthetic picture to be provided to television (TV) viewers.

FIG. 3 shows a concrete example of a virtual studio.

A performer 101 is photographed in front of a blue background 102. Blue and inconspicuous markers (patterns) M1 to M9 are added to the background 102. Each position on three dimensions of the markers M1 to M9 is measured beforehand on the basis of a specific fixed coordinate system (world coordinates)

Next, a picture generator 103 will be described. The picture generator 103 is provided with a mobile television (TV) camera 104 for photographing the performer 101 in front of the background 102. The markers M1 to M9 can be slightly recognized by the TV camera 104 though the markers are inconspicuous because they are located in the blue background 102 as described above. Therefore, the three-dimensional positions of the markers M1 to M9 on the basis of the TV camera 104 can be measured.

The picture generator 103 is also provided with a markers' positional information storage 105 for storing the three-dimensional positional information PDW of markers M1 to M9 on the basis of the world coordinates. The picture generator 103 is also provided with a camera parameter calculator 106 for acquiring the three-dimensional position and the orientation of the TV camera 104 on the basis of the world coordinates based upon the three-dimensional positional information PDT obtained with the TV camera 104 of the markers M1 to M9 on the basis of the TV camera 104 and three-dimensional positional information PDW read from the markers' positional information storage 105.

Suppose that relationship between the three-dimensional positions of the markers M1 to M9 on the basis of the world coordinates and the three-dimensional positions of the markers M1 to M9 on the basis of the TV camera 104 is equivalent to relationship between rotational transform R and translational transform T. According to the camera parameter calculator 106, the three-dimensional position of the TV camera 104 on the basis of the world coordinates is T and the orientation is R. The acquired information of the three-dimensional position and the orientation is output from the camera parameter calculator 106 as the viewpoint information POV of the TV camera 104.

The picture generator 103 is also provided with a CG information storage 107 for storing the three-dimensional positional information PCG of an object generated by CG on the basis of the world coordinates, for example, the information of in what position in three-dimensional space "Japanese map including weather information" generated by CG virtually exists. In this case, in the CG information storage 107, the three-dimensional positional information PCG on the basis of the world coordinates of multiple objects generated by CG is stored. The three-dimensional positional information PCG of a suitable object generated by CG is selectively read from the CG information storage 107 by a control unit described later and used. That is, the three-dimensional positional information PCG of a predetermined object generated by CG is read according to a reading request signal RRQ supplied to the CG information storage 107 from the control unit.

The picture generator 103 is also provided with a CG data generator 108 for generating two-dimensional video data VDc corresponding to the projected picture of a predetermined object generated by CG to which perspective transformation viewed from the viewpoint of the TV camera 104 is applied based upon the viewpoint information POV of the TV camera 104 output from the camera parameter calculator 106 and the three-dimensional positional information PCG of the predetermined object generated by CG read from the CG information storage 107. In this case, in the CG data generator 108, two-dimensional video data (corresponding to the picture to which perspective transformation is applied) VDc for "Japanese map including weather information" for example which looks as if it were viewed from the viewpoint (the three-dimensional position and the orientation) of the TV camera 104 is generated.

The picture generator 103 is also provided with a delay unit 109 for adjusting time for delaying video data VDa output from the TV camera 104. In this case, delay time by the delay unit 109 is set so that when two-dimensional video data VDc in a case viewed from the viewpoint of the TV camera 104 at time T1 is output from the CG data generator 108, video data VDa obtained by photographing with the TV camera 104 at the time T1 is output from the delay unit 109 as video data VDb.

That is, it takes some time for calculation in the camera parameter calculator 106 and the CG data generator 108 and when it takes t seconds since three-dimensional positional information PDT at certain time is supplied from the TV camera 104 to the camera parameter calculator 106 until two-dimensional video data VDc corresponding to the three-dimensional positional information PDT is output from the CG data generator 108, delay time by the delay unit 109 is t seconds.

If two-dimensional video data VDc output from the CG data generator 108 as described later and video data VDb output from the delay unit 109 are synthesized by adjusting time in the delay unit 109 as described above, a synthetic picture which looks as if it is a picture obtained by photographing an object generated by CG and the performer 101 respectively existing in the same space can be acquired.

The picture generator 103 is also provided with an α blender 110 for mixing two-dimensional video data VDc output from the CG data generator 108 and video data VDb output from the delay unit 109 and a key generator 111 for acquiring the value of α supplied to the α blender 110 as a key signal based upon video data VDa output from the TV camera 104.

In the key generator 111, operation for separating a blue picture element and a picture element which is not completely blue in video data VDa is executed. The value of α is output every picture element of video data VDa from the key generator 111. In this case, α=0 in a blue picture element, α=1 in a picture element which is not completely blue and further, 0 <α<1 in a halftone part.

The TV camera 104 photographs the performer 101 explaining a weather forecast for example using the blue background 102. Therefore, as the projected picture of the background 102 is blue, α=0 in picture elements corresponding to the background 102 in video data VDa. In the meantime, as the projected picture of the performer 101 is not blue, α=1 in picture elements corresponding to the performer 101 in video data VDa. Further, as the projected picture of a boundary between the performer 101 and the background 102 is dim because of the distortion of a projection lens and others and blue in the background 102 and color except blue in the performer 101 are mixed, 0<α<1 in picture elements corresponding to the boundary between the performer 101 and the background 102 in video data VDa.

As described above, when two-dimensional video data VDc in a case viewed from the viewpoint of the TV camera 104 at time T1 is output from the CG data generator 108, video data VDa obtained by photographing with the TV camera 104 at the time T1 is output from the delay unit 109 as video data VDb, however, similarly time is adjusted so that when two-dimensional video data VDc in a case viewed from the viewpoint of the TV camera 104 at the time T1 is output from the CG data generator 108, the value of α acquired based upon video data VDa obtained by photographing with the TV camera 104 at the time T1 is output from the key generator 111.

In the α blender 110, operation in the following expression (1) is applied to two-dimensional video data VDc generated in the CG data generator 108 and video data VDb output from the delay unit 109 so as to acquire synthetic video data VDd.

$$VDd = \alpha \times VDb + (1-\alpha) \times VDc \tag{1}$$

As α=0 in picture elements corresponding to the background 102 in video data VDb, two-dimensional video data VDc is output from the α blender 110 as it is as synthetic video data VDd. As α=1 in picture elements corresponding to the performer 101 in video data VDb, video data VDb is output from the α blender 110 as it is as synthetic video data VDd. Further, 0<α<1 in picture elements corresponding to a boundary between the background 102 and the performer 101 in video data VDb and synthetic video data VDd in which video data VDb and VDc are mixed is output from the α blender 110. As described above, as synthetic video data VDd in which video data VDb and VDc are mixed is output to picture elements corresponding to the boundary between the background 102 and the performer 101 in video data VDb, a sense of incompatibility on the boundary is removed.

The picture generator 103 is also provided with an output terminal 112 for outputting synthetic video data VDd as data for a synthetic picture to be provided to viewers and a monitor 113 to which the synthetic video data VDd is supplied for displaying a picture based upon the synthetic video data VDd as a picture for assisting the performance of the performer 101.

The picture generator 103 is also provided with a control unit 114 for supplying a reading request signal RRQ to the CG information storage 107 according to an operation by a director. A user interface is normally provided to the control unit 114. That is, video data VDa output from the TV camera 104 is supplied, a picture based upon the video data VDa is displayed on the monitor not shown and information photographed by the TV camera 104 is provided to the director who manages the whole virtual studio. The director selects a suitable picture generated by CG in accordance with the current progress of a weather forecast program for example and inputs the information to the input device not shown of the control unit 114. In the meantime, the control unit 114 supplies the above information to the CG information storage 107 as a reading request signal RRQ.

For example, if a director judges that it is time for a weather forecast in relation to Japan to be broadcast, he/she instructs the control unit 114 to provide "Japanese map including weather information". The control unit 114 supplies the above information to the CG information storage 107 as a reading request signal RRQ. Hereby, the three-dimensional positional information PCG of "Japanese map including weather information" generated by CG is read from the CG information storage 107 and is supplied to the CG data generator 108.

Next, the operation of the picture generator 103 will be described. The performer 101 is photographed in front of the background 102 with the TV camera 104. Video data VDa is acquired from the TV camera 104, is delayed by the delay unit 109 by time corresponding to the processing time of the camera parameter calculator 106 and the CG data generator 108 and is supplied to the α blender 110 as video data VDb.

The three-dimensional positional information PDT of markers M1 to M9 on the basis of the TV camera 104 is output from the TV camera 104 and is supplied to the camera parameter calculator 106. In the meantime, the three-dimensional positional information PDW of the markers M1 to M9 on the basis of the world coordinates is read from the markers' positional information storage 105 and is supplied to the camera parameter calculator 106. In the camera parameter calculator 106, the three-dimensional position and the orientation of the TV camera 104 on the basis of the world coordinates are calculated based upon the three-dimensional positional information PTD and PDW of the markers M1 to M9.

The information of the three-dimensional position and the orientation of the TV camera 104 acquired in the camera parameter calculator 106 is supplied to the CG data generator 108 as the viewpoint information POV of the TV camera 104. In the meantime, the three-dimensional positional information PCG of a predetermined object generated by CG is read from the CG information storage 107 in response to a reading request signal RRQ supplied from the control unit 114 and is supplied to the CG data generator 108. In the CG data generator 108, two-dimensional video data VDc corresponding to the projected picture of the predetermined object generated by CG to which perspective transformation viewed form the viewpoint of the TV camera 104 is applied is generated based upon the viewpoint information POV of the TV camera 104 and the three-dimensional positional information PCG of the predetermined object generated by CG. For example, the two-dimensional video data VDc of "Japanese map including weather information" which looks as if it were viewed from the viewpoint of the TV camera 104 is generated. The two-dimensional video data VDc generated in the CG data generator 108 is supplied to the α blender 110.

Video data VDa output from the TV camera 104 is supplied to the key generator 111 and on the key generator 111, the value of α as a key signal for achieving a so-called soft key is generated based upon the video data VDa. The value of α is supplied to the α blender 110. In the α blender 110, operation in the expression (1) is applied to two-dimensional video data VDc output from the CG data generator 108 and video data VDd output from the delay unit 109 and synthetic video data VDb for displaying a synthetic picture obtained by synthesizing the projected picture or a predetermined object generated by CG and the projected picture of the performer 101 is acquired.

Synthetic video data VDd output from the α blender 110 is output to the output terminal 112 as the data of a synthetic picture to be provided to viewers. The synthetic video data VDd is also supplied to the monitor 113 and a picture based upon the synthetic video data VDd is displayed on the screen of the monitor 113 as a picture for assisting the performance of the performer 101.

Referring to FIGS. 4A to 4D, it will be described what picture is actually generated in each processing of the picture generator 103.

FIG. 4A shows a picture based upon video data VDa output from the TV camera 104 at certain time. Picture elements corresponding to the background 102 are blue. Picture elements corresponding to the performer 101 are not blue. Further, picture elements on a boundary between the performer 101 and the background 102 have color obtained by mixing blue and color except blue. The same reference number is allocated to each picture corresponding to the performer 101, the background 102 and the markers M1 to M9. The following each picture is also similar.

FIG. 4B shows the value of α output from the key generator 111. "α=0" in picture elements corresponding to the background 102. "α=1" in picture elements corresponding to the performer 101. Further, 0<α<1 in picture elements on a boundary between the performer 101 and the background 102.

FIG. 4C shows a picture based upon two-dimensional video data VDc generated in the CG data generator 108. FIG. 4C shows a case that the three-dimensional positional information PCG of "Japanese map including weather information" generated by CG is read from the CG information storage 107.

FIG. 4D shows a picture based upon synthetic video data VDd output from the α blender 110. That is, FIG. 4D shows a picture in which the picture shown in FIG. 4A and the picture shown in FIG. 4C are mixed every picture element depending upon the value of α of each picture element.

Further, a case that the TV camera 104 is moved at the following time will be considered. In this case, even if the performer 101 stands still, a picture corresponding to the performer 101 in a picture based upon video data VDa output from the TV camera 104 is moved on the screen. In the camera parameter calculator 106, as the three-dimensional position and the orientation of the TV camera 104 on the basis of the world coordinates are calculated and the information of the three-dimensional position and the orientation is supplied to the CG data generator 108 as the viewpoint information POV of the TV camera 104, two-dimensional video data VDc output from the CG data generator 108 varies even if the three-dimensional positional information PCG of an object generated by CG read from the CG information storage 107 is similar. Because a projected picture also varies if a viewed position varies in perspective transformation.

The quantity in which a picture based upon video data VDc to which perspective transformation is applied at certain time and at the next time varies is equal to the quantity in which a picture varies by the movement of the TV camera 104. Therefore, the quantity in which a picture based upon video data VDc to which perspective transformation is applied at certain time and at the next time varies corresponds to the quantity in which the projected picture of the performer 101 photographed with the TV camera 104 varies. Therefore, in a picture based upon synthetic video data VDd finally acquired, the projected picture of the performer 101 and the projected picture of an object generated by CG move similarly. That is, a picture based upon synthetic video data VDd finally acquired looks as if the above picture were a picture obtained by photographing an object generated by CG, for example Japanese map including weather information and the performer 101 respectively existing in the same space.

In the above picture generator 103, a picture based upon synthetic video data VDd, that is, a picture obtained by synthesizing the projected picture of the performer 101 and the projected picture of the object generated by CG is displayed on the monitor 113. The performer 101 can grasp in what positional relationship he/she and the object generated by CG are by performing, watching the picture. Hereby, the performer 101 can also point to a specific part in "Japanese map including weather information" generated by CG for example.

As described above, when it takes t seconds for processing in the camera parameter calculator 106 and the CG data generator 108, delay time by the delay unit 109 is t seconds and time is adjusted. Therefore, a picture displayed on the monitor 113 is a picture obtained by photographing an event at time prior by t seconds. Concretely, if the performer 101 raises his/her hand, the projected picture of the performer 101 displayed on the monitor 113 raises his/her hand after t seconds. As described above, there is a problem that it is difficult for the performer 101 to perform, watching his/her motion before t seconds on the monitor 113.

The object of the present invention is to remove the delay of a picture for assisting the performance of a performer so that the performer can readily perform.

DISCLOSER OF THE INVENTION

A picture generator according to the present invention is provided with mobile photographing means for acquiring first video data by photographing a performer in front of a predetermined background, camera parameter calculating means for acquiring the viewpoint of the photographing means, first video data generating means for generating second video data corresponding to the projected picture of a predetermined object to which perspective transformation in a case viewed from the viewpoint of the photographing means acquired in the camera parameter calculating means is applied, data delay means for acquiring third video data obtained by delaying the first video data corresponding to processing time in the camera parameter calculating means and the first video data generating means, first video data synthesizing means for acquiring first synthetic video data by synthesizing the third video data and the second video data, second video data synthesizing means for acquiring second synthetic video data by synthesizing the first video data and the second video data and picture display means for displaying a picture for assisting the performance of the performer based upon the second synthetic video data.

A picture generation method according to the present invention is provided with the steps of acquiring first video data by photographing a performer in front of a predetermined background with mobile photographing means, acquiring the viewpoint of the photographing means, generating second video data corresponding to the projected picture of a predetermined object to which perspective transformation in a case viewed from the viewpoint of the photographing means is applied, acquiring third video data by delaying the first video data corresponding to processing time in the step for acquiring the viewpoint of the photographing means and in the step for generating the second video data, acquiring first synthetic video data by synthesizing the third video data and the second video data, acquiring second synthetic video data by synthesizing the first video data and the second video data and displaying a picture for assisting the performance of the performer based upon the second synthetic video data.

First video data is acquired by photographing a performer in front of a predetermined background, for example a blue background with mobile photographing means and third video data is acquired by delaying the first video data. The three-dimensional position and the orientation of the photographing means on the basis of the viewpoint of the photographing means, for example the world coordinates are also acquired and second video data corresponding to a predetermined object to which perspective transformation in a case viewed from the viewpoint is applied, for example the projected picture of an object generated by CG is generated. The third video data and the second video data are synthesized and first synthetic video data for a synthetic picture to be provided to viewers for example is acquired.

In this case, the third video data is acquired by delaying the first video data corresponding to processing time for acquiring the second video data, and the third video data obtained by photographing with the photographing means at certain time and the second video data corresponding to the projected picture of a predetermined object to which perspective transform in a case viewed from the viewpoint of the photographing means at the certain time is applied are synthesized. Therefore, the motion of the projected picture of the performer in a picture based upon the first synthetic video data for the motion of the performer is delayed by time in which the third video data is delayed.

The second synthetic video data is acquired by synthesizing the first video data output from the photographing means and the second video data. A picture based upon the second synthetic video data is displayed as a picture for assisting the performance of the performer. As the first video data is used as it is without delaying it when the second synthetic video data is acquired, the motion of the projected picture of the performer in a picture based upon the second synthetic video data is hardly delayed.

Picture switching signal generating means for acquiring a picture switching signal for fetching either of the first video data or the second video data based upon the first video data is further provided and in the second video data synthesizing means, the first video data and the second video data are switched according to a picture switching signal and may be also synthesized. For example, if the video data synthesizing means is constituted by an α blender, the value of α as a picture switching signal is 0 or 1. That is, in the picture switching signal generating means, the value of α is determined depending upon whether the first video data exceeds a threshold or not and can be output and a picture switching signal can be readily acquired at high speed.

Camera parameter forecasting means for forecasting the viewpoint of the photographing means at current time or at time posterior to the current time based upon the viewpoint of the photographing means acquired in the camera parameter calculating means and second video data generating means for generating fourth video data corresponding to the projected picture of a predetermined object to which perspective transformation in a case viewed from the viewpoint forecast in the camera parameter forecasting means of the photographing means is applied are further provided, and in the second video data synthesizing means, the first and fourth video data may be also synthesized in place of synthesizing the first and second video data.

In this case, the fourth video data corresponds to the projected picture of the predetermined object to which perspective transformation in a case viewed from the viewpoint of the photographing means at current time is applied. Therefore, the second synthetic video data is acquired by synthesizing the first video data at current time and video data corresponding to the projected picture of the predetermined object to which perspective transformation in a case viewed from the viewpoint of the photographing means at the current time is applied, even while the photographing means is moved, a precise synthetic picture (a picture for assisting performance) which looks as if the precise synthetic picture were a picture obtained by photographing the predetermined object and the performer respectively existing in the same space can be acquired and the performer can also readily perform when the photographing means is moved.

PREFERRED EMBODIMENTS OF THE INVENTION

Figure 1:
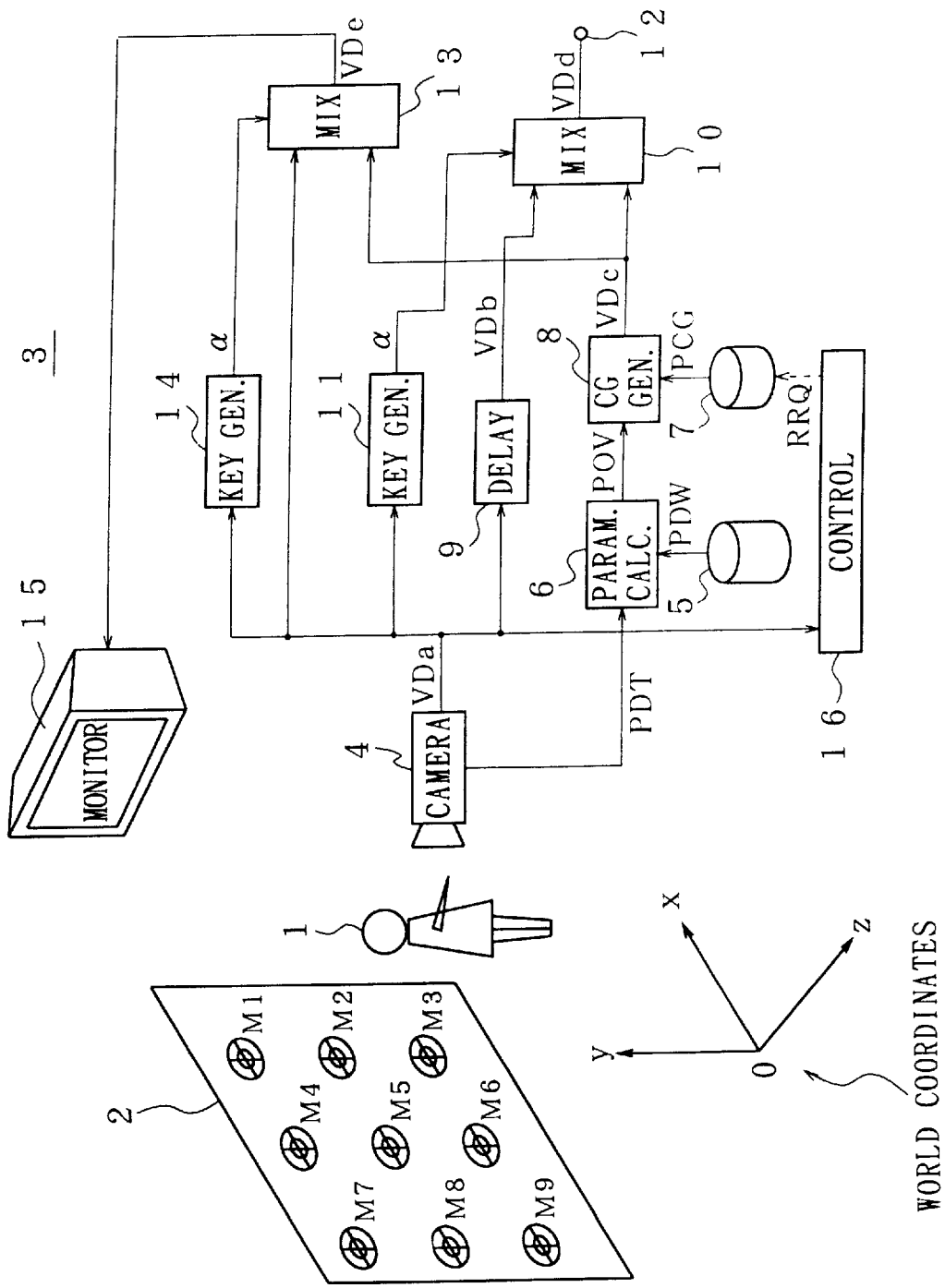
FIG. 1 shows a virtual studio provided with a picture generator equivalent to a first embodiment.
Figure 3:
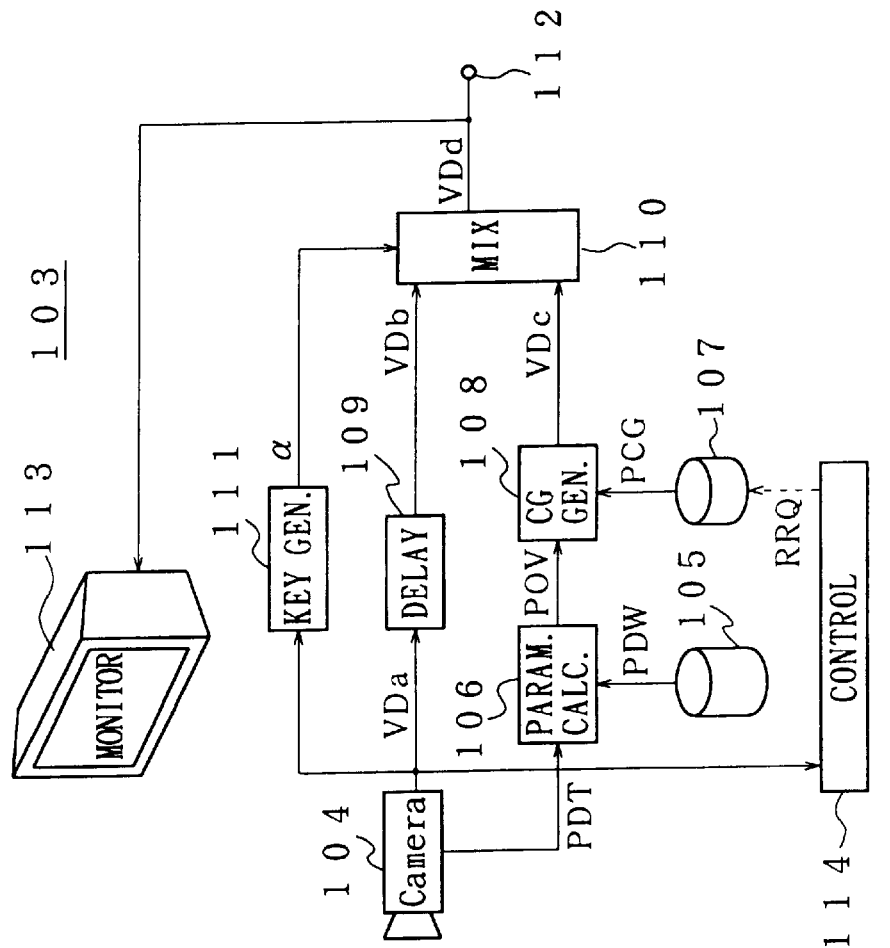
FIG. 3 shows a virtual studio provided with a conventional type picture generator.
Figure 3:
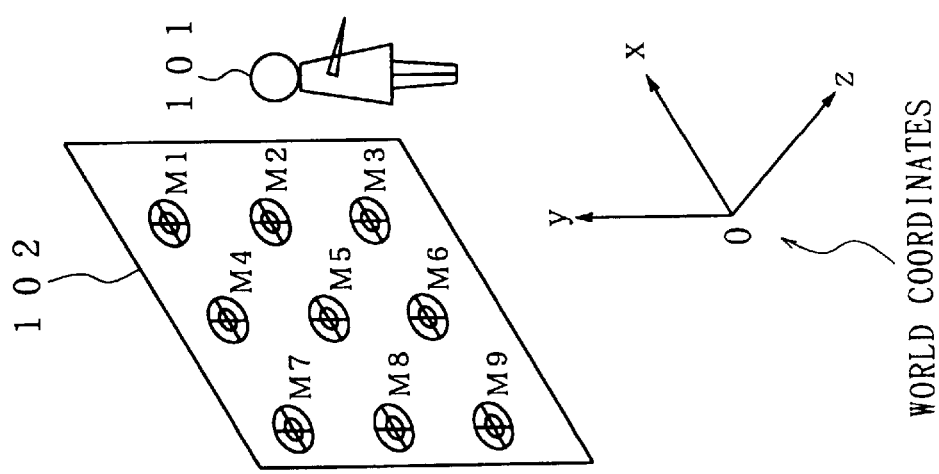
Figure 4A:
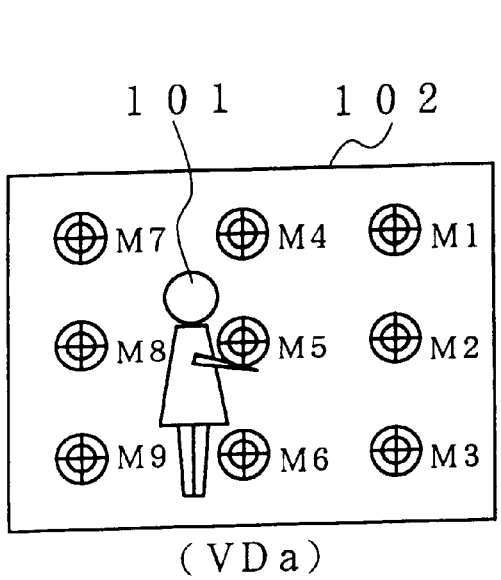
FIGS. 4A to 4D explain the picture of each section of the conventional type picture generator.
Figure 4B:
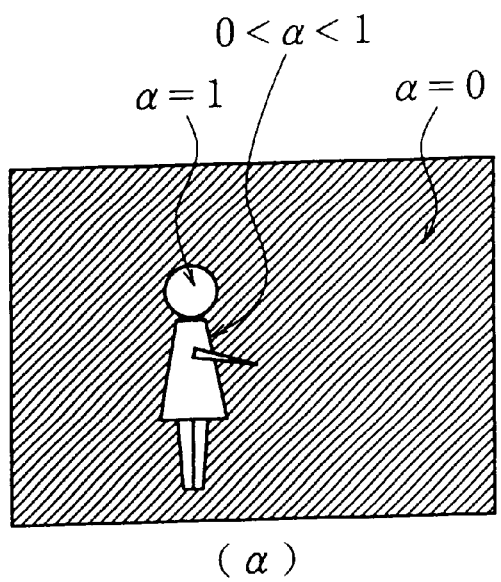
Figure 4C:
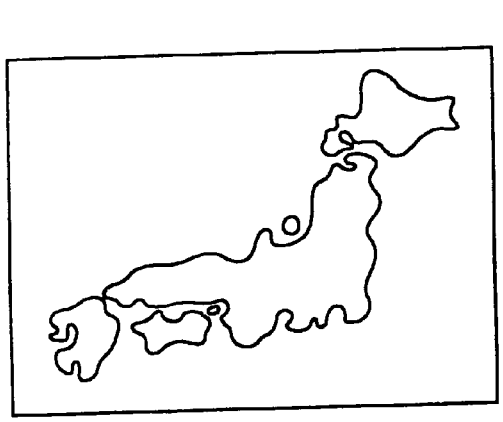
Figure 4D:
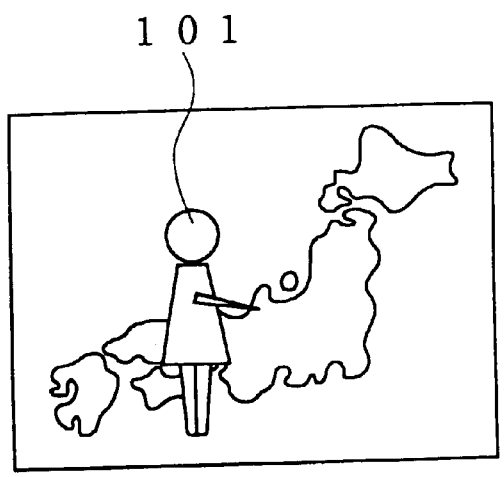

Referring to the drawings, embodiments of the present invention will be described below. FIG. 1 shows a virtual studio provided with a picture generator 3 equivalent to a first embodiment of the present invention. In the virtual studio, a performer is photographed in front of a blue background with a TV camera as in the virtual studio shown in FIG. 3, video data from the TV camera and the video data of an object generated by CG such as Japanese map including weather information are synthesized and synthetic video data related to a synthetic picture to be provided to TV viewers is acquired.

In the virtual studio, a performer 1 is photographed using a blue background 2. Blue and inconspicuous markers (patterns) M1 to M9 are added to the background 2 as the background 102 in the virtual studio shown in FIG. 3. The positions on three dimensions of the markers M1 to M9 are measured beforehand on the basis of a specific fixed coordinate system (world coordinates).

Next, the picture generator 3 will be described. The picture generator 3 is provided with a mobile television (TV) camera 4 for photographing the performer 1 in front of the background 2. Though the markers M1 to M9 are inconspicuous because they are located on the blue background 2 as described above, they can be slightly recognized by the TV camera 4. Therefore, the three-dimensional positions of the markers M1 to M9 on the basis of the TV camera 4 can be measured.

The picture generator 3 is also provided with a camera parameter calculator for acquiring the three-dimensional position and the orientation of the TV camera 4 on the basis of the world coordinates based upon the three-dimensional positional information PDT of the markers M1 to M9 on the basis of the TV camera 4 obtained in a markers' positional information storage 5 for storing the three-dimensional positional information PDW of the markers M1 to M9 on the basis of the world coordinates and the TV camera 4, and three-dimensional positional information PDW read from the markers' positional information storage 5.

Assuming that relationship between the three-dimensional positions of the markers M1 to M9 on the basis of the world coordinates and the three-dimensional positions of the markers M1 to M9 on the basis of the TV camera 4 is equivalent to relationship between rotational transform R and translational transform T, the three-dimensional position of the TV camera 4 on the basis of the world coordinates is T and the orientation is R according to the camera parameter calculator 6. The acquired information of the three-dimensional position and the orientation is output from the camera parameter calculator 6 as the viewpoint information POV of the TV camera 4.

In this embodiment, the number of the markers M1 to M9 in the background 2 is 9, however, a number other than the number 9 may be also used. The three-dimensional position on the world coordinates and the orientation of the TV camera 4 can be also acquired by a sensor mechanically attached to the TV camera 4. For example, the TV camera 4 is put on a turning base and can be turned using a gear. The orientation of the TV camera 4 can be known based upon the quantity in which the gear is rotated. In this case, data supplied from the TV camera 4 to the camera parameter calculator 6 is the rotated quantity of the gear and the camera parameter calculator 6 is constituted so that the orientation and others of the TV camera 4 are calculated based upon the rotated quantity. The markers' positional information storage 5 is not required. In any case, the information of the three-dimensional position and the orientation of the TV camera 4 on the basis of the world coordinates is output from the camera parameter calculator 6 as the viewpoint information POV of the TV camera 4.

The picture generator 3 is also provided with a CG information storage 7 for storing the three-dimensional positional information PCG of an object generated by CG on the basis of the world coordinates, for example, the information of in what position in three-dimensional space "Japanese map including weather information" generated by CG virtually exists. In this case, in the CG information storage 7, the three-dimensional positional information PCG on the basis of the world coordinates of multiple objects generated by CG is stored and the three-dimensional positional information PCG of a suitable object generated by CG in the above information is selectively read and used, however, the selection is executed by a control unit described later. That is, the three-dimensional positional information PCG of a predetermined object generated by CG is read according to a reading request signal RRQ supplied from the control unit to the CG information storage 7.

The picture generator 3 is also provided with a CG data generator 8 for generating two-dimensional video data VDc corresponding to the projected picture obtained by applying perspective transformation viewed from the viewpoint of the TV camera 4 to a predetermined object generated by CG based upon the viewpoint information POV of the TV camera 4 output from the camera parameter calculator 6 and the three-dimensional positional information PCG of the predetermined object generated by CG read from the CG information storage 7. In this case, in the CG data generator 8, the two-dimensional video data VDc (corresponding to a picture obtained by applying perspective transformation) of "Japanese map including weather information" for example which looks as if it were viewed from the viewpoint (the three-dimensional position and the orientation) of the TV camera 4 is generated.

The picture generator 3 is also provided with a delay unit 9 for adjusting time for delaying video data VDa output from the TV camera 4. In this case, the delay time of the delay unit 9 is set so that video data VDa obtained by photographing with the TV camera 4 at time T1 is output from the delay unit 9 as video data VDb when two-dimensional video data VDc in a case viewed from the viewpoint of the TV camera 4 at the time T1 is output from the CG data generator 8.

That is, it takes fixed time for calculation in the camera parameter calculator 6 and the CG data generator 8, however, when it takes t seconds since three-dimensional positional information PDT at certain time is supplied from the TV camera 4 to the camera parameter calculator 6 until two-dimensional video data VDc corresponding to the three-dimensional positional information PDT is output from the CG data generator 8, the delay time of the delay unit 9 is t seconds.

If two-dimensional video data VDc output from the CG data generator 8 and video data VDb output from the delay unit 9 are synthesized as described later, a synthetic picture which looks as if an object generated by CG and the performer 1 were a picture obtained by photographing them existing in the same space can be obtained by adjusting time by the delay unit 9 as described above.

The picture generator 3 is also provided with an α blender 10 for acquiring synthetic video data VDd by mixing two-dimensional video data VDc output from the CG data generator 8 and video data VDb output from the delay unit 9 and a key generator 11 for acquiring the value of α for supplying to the α blender 10 as a key-signal based upon video data VDa output from the TV camera 4.

In the key generator 11, operation for separating a blue picture element and a picture element which is completely not blue is executed based upon video data VDa. The value of α is output every picture element in video data VDa from the key generator 11. In this case, α=0 in a blue picture element, α=1 in a picture element which is completely not blue and further, 0<α<1 in an halftone part.

The TV camera 4 photographs the performer 1 explaining a weather forecast for example using the blue background 2. Therefore, as the projected picture of the background 2 is blue, α=0 in picture elements corresponding to the background 2 in video data VDa. In the meantime, as the projected picture of the performer 1 is not blue, α=1 in picture elements corresponding to the performer 1 in the video data VDa. Further, as the projected picture of a boundary between the performer 1 and the background 2 is dim because of the distortion of a projection lens and others and has color in which the blue of the background 2 and the color except blue of the performer 1 are mixed, 0<α<1 in picture elements corresponding to a boundary between the performer 1 and the background 2 in video data VDa.

As described above, when two-dimensional data VDc in a case viewed from the viewpoint of the TV camera 4 at time t1 is output from the CG data generator 8, video data VDa obtained by photographing with the TV camera 4 at the time T1 is output from the delay unit 9 as video data VDb, and similarly time is adjusted so that when two-dimensional video data VDc in a case viewed from the viewpoint of the TV camera 4 at the time t1 is output from the CG data generator 8, the value of a acquired based upon video data VDa obtained by photographing with the TV camera 4 at the time T1 is output from the key generator 11.

The above expression (1) is operated based upon two-dimensional video data VDc generated in the CG data generator 8 and video data VDb output from the delay unit 9 by the α blender 10 so as to acquire synthetic video data VDd. As α=0 in picture elements corresponding to the background 2 in video data VDb, two-dimensional video data VDc is output from the α blender 10 as it is as synthetic video data VDd. As α=1 in picture elements corresponding to the performer 1 in video data VDb, video data VDb is output from the α blender 10 as it is as synthetic video data VDd. Further, 0<α<1 in picture elements corresponding to a boundary between the background 2 and the performer 1 in video data VDb and synthetic video data VDd in which video data VDb and VDc are mixed is output from the α blender 10. As described above, a so-called sense of incompatibility in a part on the following boundary can be reduced by outputting synthetic video data VDd in which video data VDb and VDc are mixed to picture elements corresponding to a boundary between the background 2 and the performer 1 in video data VDb.

The picture generator 3 is also provided with an output terminal 12 for outputting synthetic video data VDd as the data of a synthetic picture to be provided to viewers. In this embodiment, the synthetic video data VDd is not used for displaying a picture for assisting a performance. The TV camera 4, the markers' positional information storage 5, the camera parameter calculator 6, the CG information storage 7 and the CG data generator 8, the delay unit 9, the α blender 10 and the key generator 11 respectively described above are constituted in the same way as the TV camera 104, the markers' positional information storage 105, the camera parameter calculator 106, the CG information storage 107, the CG data generator 108, the delay unit 109, the α blender 110 and the key generator 111 respectively in the image generator 103 shown in FIG. 3.

The picture generator 3 is also provided with an α blender 13 for acquiring synthetic video data VDe by mixing video data VDa output from the TV camera 4 and two-dimensional video data VDc generated by CG data generator 8 and α simple type key generator 14 for acquiring the value of a supplied to the α blender 13 as a key signal out of video data VDa output from the TV camera 4.

In the simple type key generator 14, operation for separating a blue picture element and a part except the blue picture element in video data VDa is executed. The value of α is output every picture element in video data VDa from the key generator 14. In this case, α=0 in a blue picture element and α=1 in a picture element except a blue picture element. The possible values of α are 0 and 1. As the projected picture of the background 2 is blue, α=0 in picture elements corresponding to the background 2 in video data VDa. As the projected picture of the performer 1 is not blue, α=1 in picture elements corresponding to the performer 1 in video data VDa. Further, the projected picture of a boundary between the performer 1 and the background 2 is dim because of the distortion of a projection lens and others, however, α=0 or α=1 depending upon whether a pixel value exceeds a threshold or not.

In the above key generator 11, the value of α, "0<α<1" is acquired for a halftone. However, in the key generator 14, the value of α is determined to 0 or 1 depending upon whether it exceeds a threshold or not. Therefore, processing in the key generator 14 is simpler, compared with processing the key generator 11 and high speed processing is enabled. If high speed processing is enabled in the key generator 11, a key generator constituted as in the key generator 11 may be also used in place of the key generator 14.

In the α blender 13, operation in the following expression (2) is executed based upon video data VDa output from the TV camera 4 and two-dimensional video data VDc generated by the CG data generator 8 to obtain synthetic video data VDe.

$$VDe = \alpha \times VDa + (1-\alpha) \times VDc \quad (2)$$

The picture generator 3 is also provided with a monitor 15 to which synthetic video data VDe is supplied for displaying a picture based upon the synthetic video data VDe as a picture for assisting the performance of the performer 1. As α=0 in picture elements corresponding to the background 2 in video data VDa, two-dimensional video data VDc is output from the α blender 13 as it is as synthetic video data VDe. As α=1 in picture elements corresponding to the performer 1 in video data VDa, video data VDa is output from the α blender 13 as it is as synthetic videodata VDe. Aα=0 or α=1 in picture elements corresponding to a boundary between the background 2 and the performer 1 in video data VDa and the synthetic video data VDe extremely varies, a synthetic picture based upon the synthetic video data VDe in the picture elements corresponding to the boundary between the background 2 and the performer 1 looks unnatural. However, as the synthetic picture is a picture for assisting the performance of the performer 1 and positional relationship between the performer 1 and an object generated by CG has only to be grasped, there is no problem even if the synthetic picture on the boundary looks unnatural.

The picture generator 3 is also provided with a control unit 16 for supplying a reading request signal RRQ to the CG information storage 7 according to an operation by a director. A user interface is normally provided to the control unit 16. That is, video data VDa output from the TV camera 4 is supplied, a picture based upon the video data VDa is displayed on the monitor not shown and information photographed by the TV camera 4 is provided to the director who manages the whole virtual studio. The director selects a picture by CG in accordance with the current progress of a weather forecast program for example and inputs the information to an input device not shown of the control unit 16. In the meantime, the control unit 16 supplies the information to the CG information storage 7 as a reading request signal RRQ.

If the director judges that it is currently time for a weather forecast in relation to Japan to be broadcast, he/she instructs the control unit 16 to provide "Japanese map including weather information". The control unit 16 supplies the information to the CG information storage 7 as a reading request signal RRQ. Hereby, the three-dimensional positional information PCG of "Japanese map including weather information" generated by CG is read from the CG information storage 7 and is supplied to the CG data generator 8.

Next, the operation of the picture generator 3 will be described. The performer 1 is photographed in front of the background 2 with the TV camera 4 and video data VDa is acquired from the TV camera 4. The video data VDa is delayed by time corresponding to the processing time of the camera parameter calculator 6 and the CG data generator 8 by the delay unit 9 and is supplied to the α blender 10 as video data VDb.

The three-dimensional positional information PDT of the markers M1 to M9 on the basis of the TV camera 4 is output from the TV camera 4 and is supplied to the camera parameter calculator 6. In the meantime, the three-dimensional positional information PDW of the markers M1 to M9 on the basis of the world coordinates is read from the markers' positional information storage 5 and is supplied to the camera parameter calculator 6. In the camera parameter calculator 6, the three-dimensional position and the orientation of the TV camera 4 on the basis of the world coordinates are calculated based upon the three-dimensional positional information PDT and PDW of the markers M1 to M9.

The information of the three-dimensional position and the orientation of the TV camera 4 acquired by the camera parameter calculator 6 is supplied to the CG data generator 8 as the viewpoint information POV of the TV camera 4. In the meantime, the three-dimensional positional information PCG of a predetermined object generated by CG is read from the CG information storage 7 in response to a reading request signal RRQ supplied from the control unit 16 and is supplied to the CG data generator 8. In the CG data generator 8, two-dimensional video data VDc corresponding to the projected picture to which perspective transformation viewed from the viewpoint of the TV camera 4 is applied to a predetermined object generated by CG is generated based upon the viewpoint information POV of the TV camera 4 and the three-dimensional positional information PCG of the predetermined object generated by CG. The two-dimensional video data VDc of "Japanese map including weather information" for example which looks as if it were viewed from the viewpoint of the TV camera 4 is generated. The two-dimensional video data VDc is supplied to the α blender 10.

Video data VDa output from the TV camera 4 is supplied to the key generator 11 and the value of α as a key signal for achieving a so-called soft key is generated based upon the video data VDa in the key generator 11. The value of α is supplied to the α blender 10. In the α blender 10, the operation in the above expression (1) is applied to two-dimensional video data VDc output from the CG data generator 8 and video data VDb output from the delay unit 9, and synthetic video data VDd for displaying a picture obtained by synthesizing the projected picture of a predetermined object generated by CG and the projected picture of the performer 1 is acquired. The synthetic video data VDd is output to the output terminal 12 as the data of a synthetic picture to be provided to viewers.

Video data VDa output from the TV camera 4 is supplied to the simple type key generator 14 and in the key generator 14, the value of α (α=0 or α=1) as a key signal for achieving a so-called hard key is generated based upon the video data VDa. The value of cc is supplied to the α blender 13. In the α blender 13, the operation in the above expression (2) is applied to video data VDa output from the TV camera 4 and two-dimensional video data VDc output from the CG data generator 8 and synthetic video data VDe for displaying a picture obtained by synthesizing the projected picture of a predetermined object generated by CG and the projected picture of the performer 1 is acquired. The synthetic video data VDe is supplied to the monitor 15 and a picture based upon the synthetic video data VDe is displayed on the screen of the monitor 15 as a picture for assisting the performance of the performer 1.

In the above picture generator 3, synthetic video data VDe for acquiring a synthetic picture for assisting the performance of the performer 1 is synthesized using video data VDa which is output from the TV camera 4 and to which no delay processing is applied. Therefore, the movement of the projected picture of the performer in a synthetic picture based upon synthetic video data VDe is synchronized with the movement of the performer 1 and there is an advantage that the performer can readily perform.

When the TV camera 4 is not moved in the picture generator 3 shown in FIG. 1, video data VDa photographed with the TV camera 4 at certain time and obtained and two-dimensional video data VDc corresponding to the projected picture of a predetermined object generated by CG to which perspective transformation in a case viewed from the viewpoint of the TV camera 4 at the time is applied are synthesized, synthetic video data VDe is acquired and a precise synthetic picture which looks as if the precise synthetic picture is a picture obtained by photographing the object generated by CG and the performer 1 which/who respectively exist in the same space can be acquired.

In the meantime, when the TV camera 4 is moved, two-dimensional video data VDc output from the CG data generator 8 becomes two-dimensional video data VDc corresponding to the projected picture of a predetermined object generated by CG to which perspective transformation in a case viewed from the viewpoint of the TV camera 4 at time before by the processing time of the camera parameter calculator 6 and the CG data generator 8 is applied. Therefore, a synthetic picture based upon synthetic video data VDe obtained by synthesizing the two-dimensional video data VDc and video data VDa obtained by photographing with the TV camera 4 is incorrect. However, generally, as the performer 1 points to the object generated by CG only in case the object is hardly moved on the basis of the world coordinates, the above delay is insignificant.

A case that the performer 1 performs, looking at the monitor 15 when the TV camera 4 is moved will be considered below. A slight time lag is caused in the performance of the performer 1, referring to an inaccurate synthetic picture on the screen of the monitor 15. Thus, when the performer 1 points to an object generated by CG, he/she may point to a slightly dislocated location. However, as the TV camera 4 is moved, the whole synthetic picture to be provided to viewers is moved. As the characteristics of human eyes are deteriorated if the whole scenery is moved, viewers do not perceive the performer 1 pointing to the slightly dislocated location in this case. That is, when the TV camera 4 is moved, a synthetic picture displayed on the screen of the monitor 15 may be also slightly incorrect.

Next, referring to FIG. 2, a picture generator 3A equivalent to a second embodiment of the present invention will be described.

The picture generator 3A is provided with a camera parameter forecasting section 17 for forecasting the viewpoint of a TV camera 4 at current time (the three-dimensional position and the orientation on the basis of world coordinates) based upon the viewpoint information POV of the TV camera 4 output from a camera parameter calculator 6. The above viewpoint information POV shows the viewpoint of the TV camera 4 at time prior by the processing time of the camera parameter calculator 6 to current time.

A method of forecasting a concrete camera parameter (the position and the orientation of the TV camera) in the camera parameter forecasting section 17 will be described below. Suppose that the positions and the orientations of the TV camera 4 at the past two times are respectively "T1 and R1" and "T2 and R2". The moved quantity between the positions is considered as "T2−T1". Therefore, it is linearly forecast based upon the positional information (T1, T2) at the past two times that the position at current time is "T2+(T2−T1)".

If the position of the TV camera is forecast based upon the information of the positions and the orientations at further more past times, a more precise forecast is enabled. In any case, the forecast viewpoint information POVc of the TV camera 4 at current time is output from the camera parameter forecasting section 17.

The picture generator 3A is also provided with a CG data generator 18 for generating two-dimensional video data VDf corresponding to the projected picture to which perspective transformation viewed from the viewpoint of the TV camera 4 is applied to a predetermined object generated by CG based upon the forecast viewpoint information POVc of the TV camera 4 output from the camera parameter forecasting section 17 and the three-dimensional positional information PCG of the predetermined object generated by CG read from a CG information storage 7.

In the picture generator 3 shown in FIG. 1, video data VDa output from the TV camera 4 and two-dimensional video data VDc generated in the CG data generator 8 are mixed in the α blender 13 and synthetic video data VDe is generated. However, in the picture generator 3A, video data VDa output from the TV camera 4 and two-dimensional video data VDf generated in the CG data generator 18 are mixed in the α blender 13 and synthetic video data VDe is generated. As the other configuration and the operation of the picture generator 3A are the same as those in the above picture generator 3, the description is omitted.

As described above, in the picture generator 3A shown in FIG. 2, two-dimensional video data VDf corresponding to the projected picture of a predetermined object generated by CG to which perspective transformation in a case viewed from the forecast viewpoint of the TV camera 4 at current time is applied is output from the CG data generator 18. The two-dimensional video data VDf and video data VDa obtained by photographing with the TV camera 4 are synthesized, synthetic video data VDe is generated, even when the TV camera 4 is moved, a synthetic picture based upon the synthetic video data VDe is substantially precise and a performer 1 can readily point to an object generated by CG.

In the camera parameter forecasting section 17, the viewpoint of the TV camera 4 at current time is forecast, however, further, the viewpoint of the TV camera 4 at time posterior to current time by the processing time of the CG data generator 18 may be also forecast. Hereby, in the α blender 13, synthetic video data VDe can be acquired by synthesizing video data VDa output from the TV camera 4 at certain time and two-dimensional video data VDf corresponding the projected picture of a predetermined object generated by CG to which perspective transformation in a case viewed from the viewpoint of the TV camera 4 at the certain time is applied and a more precise synthetic picture can be acquired.

According to the first embodiment of the present invention as shown in FIG. 1, there is effect that third video data can be acquired by executing the delay processing of first video data obtained by photographing a performer with mobile photographing means, synthetic video data for viewers can be acquired by synthesizing the third video data and second video data corresponding to the projected picture of a predetermined object to which perspective transformation viewed from the viewpoint of the photographing means is applied, and synthetic video data for displaying a picture for assisting the performance of the performer can be acquired by synthesizing the first video data to which no delay processing is applied and the second video data, so that the movement of the performer and a picture for assisting the performance are substantially synchronized and the performer can readily perform.

According to the first embodiment, a picture switching signal when synthetic video data for displaying a picture for assisting the performance is acquired also functions to fetch either of the first video data or the second video data and can be readily acquired at high speed.

Figure 2:
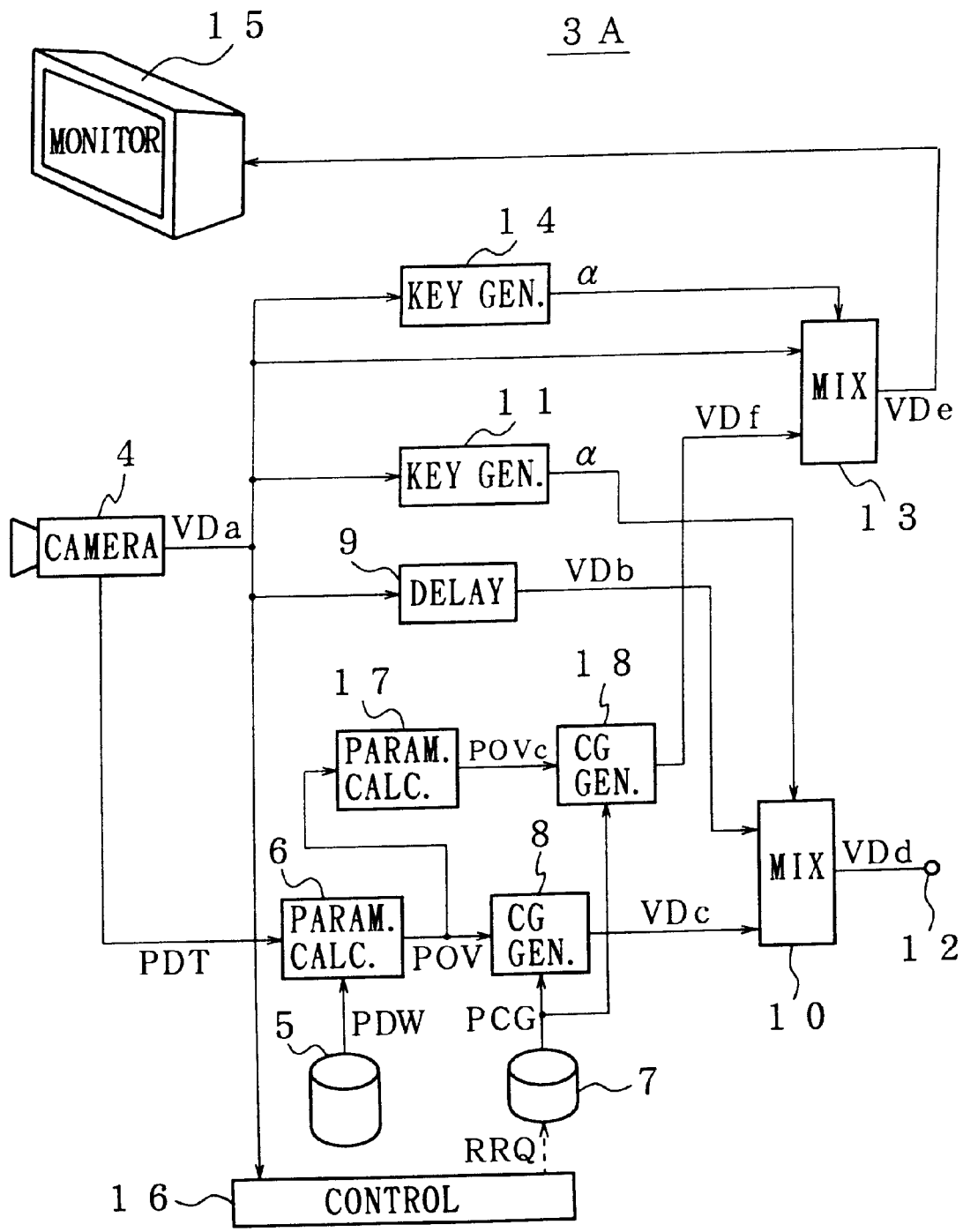
FIG. 2 is a block diagram showing a picture generator equivalent to a second embodiment.

According to the second embodiment of the present invention as shown in FIG. 2, there is also effect that the viewpoint of the photographing means at current time or at time posterior to the current time is forecast based upon the viewpoint of the photographing means acquired in the camera parameter calculating means, fourth video data corresponding to the projected picture of a predetermined object to which perspective transformation in a case viewed from the forecast viewpoint of the photographing means is applied is generated, a substantially precise synthetic picture which looks as if the substantially precise synthetic picture were a picture obtained by photographing the predetermined object and a performer respectively which exist in the same space even while the photographing means is moved can be acquired by generating synthetic video data for acquiring a picture for assisting the performance by synthesizing the fourth video data and the first video data and the performer can also readily perform when the photographing means is moved.

Unless the present invention is deviated, various variations and applied examples are conceivable. Therefore, the present invention is not limited to the above embodiments.

Industrial Availability

As described above, the picture generators and picture generation methods respectively according to the present invention can be suitably used in the virtual studio of a television station for example.

What is claimed is:

1. A picture generator, comprising:

mobile photographing means for photographing a performer in front of a predetermined background having a predetermined color to obtain first video data, said background including a plurality of inconspicuous markers each having a color similar to the predetermined color of the predetermined background;

camera parameter calculating means for acquiring viewpoint information of said photographing means including three-dimensional position and orientation of the photographing means on the basis of predetermined world coordinates;

first video data generating means for generating second video data corresponding to a projected picture of a predetermined object to which perspective transformation in a case viewed from the viewpoint of said photographing means acquired in said camera parameter calculating means is applied;

data delay means for acquiring third video data delayed corresponding to time for processing said first video data in said camera parameter calculating means and said first video data generating means;

first key signal generating means for generating a first key signal for separating a first picture element having the predetermined color of the predetermined background or a color similar thereto and a second picture element which is not the predetermined color of the predetermined background, based on said first video data;

second key generating means for generating a second key signal for separating the first picture element having the predetermined color of the predetermined background or a color similar thereto and the second picture element which is not the predetermined color of the predetermined background, based on said first video data and for acquiring a picture switching signal for fetching either of said first video data or said second video data based upon said first video data;

first video data synthesizing means for acquiring first synthetic video data by synthesizing said third video data and said second video data on the basis of said first key signal;

second video data synthesizing means for acquiring second synthetic video data by switching between said first video data and said second video data on the basis of said second key signal and synthesizing them; and picture display means for displaying a picture for assisting the performance of said performer based upon said second synthetic video data.

2. A picture generator according to claim 1, wherein said mobile photographing means further comprises a turning base, on which the mobile photographing means is put, which turns said mobile photographing means using a gear, and wherein an orientation of said mobile photographing means is based upon a quantity in which said gear is rotated.

3. A picture generator comprising:

mobile photographing means for photographing a performer in front of a predetermined background having a predetermined color to obtain first video data, said background including a plurality of inconspicuous markers each having a color similar to the predetermined color of the predetermined background;

camera parameter calculating means for acquiring viewpoint information of said photographing means including three-dimensional position and orientation of the photographing means on the basis of predetermined world coordinates using three-dimensional position and orientation of said markers obtained from said first video data on the basis of coordinates relative to said photographing means, and predetermined three-dimensional position information of said markers relative to said world coordinates;

first video data generating means for generating second video data corresponding to a projected picture of a predetermined object to which perspective transformation in a case viewed from the viewpoint of said photographing means acquired in said camera parameter calculating means is applied;

camera parameter forecasting means for forecasting the viewpoint of said photographing means at current time or at time posterior to the current time based upon the viewpoint information of said photographing means acquired in said camera parameter calculating means;

second video data generating means for generating fourth video data corresponding to the projected picture of said predetermined object to which perspective transformation in a case viewed from the viewpoint forecast in said camera parameter forecasting means of said photographing means is applied;

data delay means for acquiring third video data delayed corresponding to time for processing said first video data in said camera parameter calculating means and said first video data generating means;

first key signal generating means for generating a first key signal for separating a first picture element having the predetermined color of the predetermined background or a color similar thereto and a second picture element which is not the predetermined color of the predetermined background, based on said first video data;

second key generating means for generating a second key signal for separating the first picture element having the predetermined color of the predetermined background or a color similar thereto and the second picture element which is not the predetermined color of the predetermined background, based on said first video data and for acquiring a picture switching signal for fetching either of said first video data or said fourth video data based upon said first video data;

first video data synthesizing means for acquiring first synthetic video data by synthesizing said third video data and said second video data on the basis of said first key signal;

second video data synthesizing means for acquiring second synthetic video data by switching between said first video data and said fourth video data on the basis of said second key signal and synthesizing them; and picture display means for displaying a picture for assisting the performance of said performer based upon said second synthetic video data.

4. The picture generator according to claim 3, wherein said camera parameter forecasting means linearly forecasts a position of the photographing means at current time based upon positional information (T1, T2) of the photographing means at the past two times according to a formula T2+(T2−T1), and wherein said camera parameter forecasting means linearly forecasts an orientation of the photographing means at current time based upon orientation information (R1, R2) of the photographing means at the past two times according to a formula R2+(R2−R1).

5. A picture generation method, comprising the steps of:

acquiring first video data by photographing a performer in front of a predetermined background having a predetermined color with mobile photographing means, said background including a plurality of inconspicuous markers each having color similar to the predetermined color of the background;

acquiring viewpoint information of said photographing means including three-dimensional position and orientation of the photographing means on the basis of predetermined world coordinates using three-dimensional position information of said markers obtained from said first video data on the basis of coordinates relative to said photographing means, and predetermined three-dimensional position information of said markers relative to said world coordinates;

generating second video data corresponding to a projected picture of a predetermined object to which perspective transformation in a case viewed from the viewpoint of said photographing means is applied;

acquiring third video data by delaying said first video data corresponding to processing time in the step for acquiring the viewpoint information of said photographing means and the step for generating said second video data;

generating a first key signal for separating a first picture element having the predetermined color of the predetermined background or a color similar thereto and a second picture element which is not the predetermined color of the predetermined background, based on said first video data;

generating a second key signal for separating the first picture element having the predetermined color of the predetermined background or a color similar thereto and the second picture element which is not the predetermined color of the predetermined background, based on said first video data and for acquiring a picture switching signal for fetching either of said first video data or said second video data based upon said first video data;

acquiring first synthetic video data by synthesizing said third video data and said second video data on the basis of said first key signal;

acquiring second synthetic video data by switching between said first video data and said second video data on the basis of said second key signal and synthesizing them; and displaying a picture for assisting the performance of said performer based upon said second synthetic video data.

6. The picture generating method of claim 5, further comprising the steps of:

turning said mobile photographing means using a gear, wherein the orientation of the photographing means is based upon a quantity in which the gear is rotated.

7. A picture generation method comprising the steps of:

acquiring first video data by photographing a performer in front of a predetermined background having a predetermined color with mobile photographing means said background including a plurality of inconspicuous markers each having color similar to the predetermined color of the background;

acquiring viewpoint information of said photographing means including three-dimensional position and orientation of the photographing means on the basis of predetermined world coordinates using three-dimensional position information of said markers obtained from said first video data on the basis of coordinates relative to said photographing means, and predetermined three-dimensional position information of said markers relative to said world coordinates;

generating second video data corresponding to a projected picture of a predetermined object to which perspective transformation in a case viewed from the viewpoint of said photographing means is applied;

acquiring third video data by delaying said first video data corresponding to processing time in the step for acquiring the viewpoint information of said photographing means and the step for generating said second video data;

forecasting a viewpoint of said photographing means at current time or at time posterior to the current time based upon the viewpoint information of said photographing means acquired in the step for acquiring the viewpoint of said photographing means;

generating fourth video data corresponding to the projected picture of said predetermined object to which perspective transformation in a case viewed from said forecast viewpoint of said photographing means is applied;

generating a first key signal for separating a first picture element having the predetermined color of the predetermined background or a color similar thereto and a second picture element which is not the predetermined color of the predetermined background, based on said first video data;

generating a second key signal for separating the first picture element having the predetermined color of the predetermined background or a color similar thereto and the second picture element which is not the predetermined color of the predetermined background, based on said first video data and for acquiring a picture switching signal for fetching either of said first video data or said fourth video data based upon said first video data;

acquiring first synthetic video data by synthesizing said third video data and said second video data on the basis of said first key signal;

acquiring second synthetic video data by switching between said first video data and said fourth video data on the basis of said second key signal and synthesizing them; and displaying a picture for assisting the performance of said performer based upon said second synthetic video data.

8. The picture generating of claim 7, wherein said step of forecasting the viewpoint of said photographing means further comprising the steps of:

linearly forecasting a position of the photographing means at current time based upon positional information (T1, T2) of the photographing means at the past two times according to a formula T2+(T2−T1), and linearly forecasting an orientation of the photographing means at current time based upon orientation information (R1, R2) of the photographing means at the past two times according to a formula R2+(R2−R1).

9. A picture generator, comprising:

a mobile camera for photographing a performer in front of a predetermined background having a predetermined color to obtain first video data, said background including a plurality of inconspicuous markers each having a color similar to the predetermined color of the predetermined background;

a camera parameter calculator for acquiring viewpoint information of said mobile camera including three-dimensional position and orientation of the mobile camera on the basis of predetermined world coordinates;

a first video data generator for generating second video data corresponding to a projected picture of a predetermined object to which perspective transformation in a case viewed from the viewpoint of said mobile camera acquired in said camera parameter calculator is applied;

a data delay device for acquiring third video data delayed corresponding to time for processing said first video data in said camera parameter calculator and said first video data generator;

a first key signal generator for generating a first key signal for separating a first picture element having the predetermined color of the predetermined background or a color similar thereto and a second picture element which is not the predetermined color of the predetermined background, based on said first video data;

a second key generator for generating a second key signal for separating the first picture element having the predetermined color of the predetermined background or a color similar thereto and the second picture element which is not the predetermined color of the predetermined background, based on said first video data and for acquiring a picture switching signal for fetching either of said first video data or said second video data based upon said first video data;

a first video data synthesizer for acquiring first synthetic video data by synthesizing said third video data and said second video data on the basis of said first key signal;

a second video data synthesizer for acquiring second synthetic video data by switching between said first video data and said second video data on the basis of said second key signal and synthesizing them; and a picture display for displaying a picture for assisting the performance of said performer based upon said second synthetic video data.

10. A picture generator according to claim 9, wherein said mobile camera further comprises a turning base, on which the mobile camera is put, which turns said mobile camera using a gear, and wherein an orientation of said mobile camera is based upon a quantity in which said gear is rotated.

11. A picture generator comprising:

a mobile camera for photographing a performer in front of a predetermined background having a predetermined color to obtain first video data, said background including a plurality of inconspicuous markers each having a color similar to the predetermined color of the predetermined background;

a camera parameter calculator for acquiring viewpoint information of said mobile camera including three-dimensional position and orientation of the mobile camera on the basis of predetermined world coordinates using three-dimensional position and orientation of said markers obtained from said first video data on the basis of coordinates relative to said mobile camera, and predetermined three-dimensional position information of said markers relative to said world coordinates;

a first video data generator for generating second video data corresponding to a projected picture of a predetermined object to which perspective transformation in a case viewed from the viewpoint of said mobile camera acquired in said camera parameter calculator is applied;

a camera parameter forecaster for forecasting the viewpoint of said mobile camera at current time or at time posterior to the current time based upon the viewpoint information of said mobile camera acquired in said camera parameter calculator;

a second video data generator for generating fourth video data corresponding to the projected picture of said predetermined object to which perspective transformation in a case viewed from the viewpoint forecast in said camera parameter forecaster of said mobile camera is applied;

a data delay device for acquiring third video data delayed corresponding to time for processing said first video data in said camera parameter calculator and said first video data generator;

a first key signal generator for generating a first key signal for separating a first picture element having the predetermined color of the predetermined background or a color similar thereto and a second picture element which is not the predetermined color of the predetermined background, based on said first video data;

a second key generating means for generating a second key signal for separating the first picture element having the predetermined color of the predetermined background or a color similar thereto and the second picture element which is not the predetermined color of the predetermined background, based on said first video data and for acquiring a picture switching signal for fetching either of said first video data or said fourth video data based upon said first video data;

a first video data synthesizer for acquiring first synthetic video data by synthesizing said third video data and said fourth video data on the basis of said first key signal;

a second video data synthesizer for acquiring second synthetic video data by switching between said first video data and said fourth video data on the basis of said second key signal and synthesizing them; and a picture display for displaying a picture for assisting the performance of said performer based upon said second synthetic video data.

12. The picture generator according to claim 11, wherein said camera parameter forecaster linearly forecasts a position of the mobile camera at current time based upon positional information (T1, T2) of the mobile camera at the past two times according to a formula T2+(T2−T1), and wherein said camera parameter forecaster linearly forecasts an orientation of the mobile camera at current time based upon orientation information (R1, R2) of the mobile camera at the past two times according to a formula R2+(R2−R1).

* * * * *